Patented June 24, 1947

2,422,957

UNITED STATES PATENT OFFICE 2,422,957

1-BROMO-4-(N-ALKYLAMINO)-HEXANES AND PROCESS OF MAKING THEM

Robert C. Elderfield, Hastings on Hudson, and James D. Head, New York, N. Y., assignors to the United States of America, as represented by the Director of the Office of Scientific Research and Development No Drawing. Application April 8, 1946, Serial No. 660,415

3 Claims. (Cl. 260—583)

This invention relates to novel organic compounds and more particularly to alkylaminoalkyl halides and to the preparation thereof.

By this invention there are provided novel monoalkyl-substituted-aminoalkyl halides which may be represented by the following formula:

wherein R represents a lower alkyl hydrocarbon radical having from 1 to 6 carbon atoms; and salts thereof. Illustrative examples of compounds within the scope of this invention are 1-bromo-4-methylaminohexane hydrobromide, 1-bromo-4-(N-ethylamino)-hexane hydrobromide, 1-bromo-4-(N-isopropylamino)-hexane hydrobromide, 1-bromo-4-(sec.butylamino)-hexane, 1-bromo-4-(N-isoamylamino)-hexane hydrobromide and 1-bromo-4-(N-sec.amylamino)-hexane. Thus referring to the above formula R may be a lower alkyl radical such as a methyl, ethyl, propyl, isopropyl, a butyl, an amyl, or a hexyl radical. These compounds may be prepared in the form of their free bases but desirably are prepared and maintained in the form of their salts, in which form they are more stable.

The compounds of this invention are valuable intermediates for the preparation of antimalarial compounds.

Novel compounds disclosed in this invention may be prepared according to the series of reactions illustrated below, and in which R represents an alkyl group having from 1 to 6 carbon atoms and X represents a halogen of the class of chlorine and bromine.

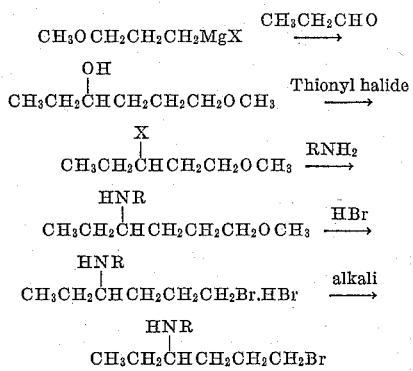

In accordance with the above series of reactions a 3-methoxypropylmagnesium halide is reacted with propionaldehyde to produce 1-methoxyhexanol-4. This compound is halogenated to produce a 1-methoxy-4-halohexane which is then reacted with a primary alkyl amine of the formula R—NH₂, wherein R is an alkyl group having from 1 to 6 carbon atoms, to yield 1-methoxy-4-(N-alkylamino)-hexane. The alkylaminohexane is reacted with hydrobromic acid to produce 1-bromo-4-(N-alkylamino)-hexane hydrobromide. The alkylaminoalkyl bromide thus obtained in the form of its salt may be converted to the free amino compound by treatment with an alkali such as sodium hydroxide, and if desired may be converted to other salts, for example the hydrochloride or sulfate salts.

The reactions involved in producing the novel compositions of this invention may be exemplified as follows:

(1) 1-methoxyhexanol-4 represented by the formula

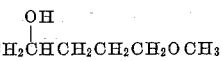

may be prepared in the following manner:

A Grignard reagent is prepared from 208 g. of 3-methoxypropyl chloride and 48 g. of magnesium in about 400 ml. of ether. The solution containing the Grignard reagent is cooled to about 0° C. and 116 g. of propionaldehyde are slowly added thereto. The reaction mixture is hydrolyzed by pouring it into a mixture of ice and dilute sulfuric acid and the 1-methoxyhexanol-4 is separated by extraction with ether. The ether extract is dried over anhydrous magnesium sulfate, the ether distilled, and the residual oil comprising 1-methoxyhexanol-4 is purified by distillation in vacuo.

1-methoxyhexanol-4 thus prepared boiled at 90–92° C. at about 15 mm. pressure. Analysis showed the presence of 63.5 percent carbon and 12.3 percent hydrogen as compared with the calculated values of 63.6 percent carbon and 12.1 percent hydrogen.

(2) 1-methoxy-4-chlorohexane represented by the formula

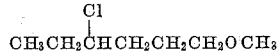

may be prepared in the following manner:

A mixture of 17 g. of 1-methoxyhexanol-4 and 10.2 g. of dry pyridine is treated with 23.8 g. of pure thionyl chloride added slowly and with stirring over a period of about 1½ hours. The mixture is then heated at 60–70° C. for about 3 hours after which a mixture of hydrochloric acid and ice is added until the reaction mixture is acid. 1-methoxy-4-chlorohexane separates as an oil and is extracted with ether, the ether extract is dried, and the 1-methoxy-4-chlorohexane is isolated by evaporation and purified by distillation.

1-methoxy-4-chlorohexane thus prepared boiled at 68–70° C. at about 15 mm. pressure. Analysis showed the presence of 56.1 percent carbon and 10.0 percent hydrogen as compared with the calculated values of 55.8 percent carbon and 10.0 percent hydrogen.

(3) 1-methoxy-4-(N-ethylamino)-hexane represented by the formula

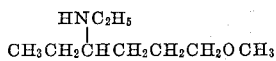

may be prepared in the following manner:

A mixture of 93 g. of 1-methoxy-4-chlorohexane and 280 g. of ethylamine is heated in a sealed bomb at about 90° C. for 44 hours. The excess ethylamine is removed from the reaction mixture by distillation and the residue is poured into an excess of 10 percent hydrochloric acid. The aqueous mixture is extracted with ether whereby unreacted 1-methoxy-4-chlorohexane is removed. The aqueous hydrochloric acid solution is then made strongly alkaline with potassium hydroxide, cooled to about 0° C. and extracted several times with ether. The ether extracts containing the 1-methoxy-4-(N-ethylamino)-hexane are combined, dried over magnesium sulfate and the ether evaporated. The residue comprising 1-methoxy-4-(N-ethylamino)-hexane is purified by distillation.

1-methoxy-4-(N-ethylamino)-hexane thus prepared boiled at 87–89° C. at about 16 mm. pressure. Analysis showed the presence of 67.5 percent carbon and 12.8 percent hydrogen as compared with the calculated values of 67.9 percent carbon and 13.2 percent hydrogen.

(4) 1-bromo-4-(N-ethylamino)-hexane hydrobromide represented by the formula

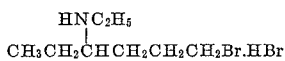

may be prepared in the following manner:

40 g. of 1-methoxy-4-(N-ethylamino)-hexane and 400 g. of 48 percent hydrobromic acid are refluxed for 5 hours and evaporated to dryness. The residue comprising 1-bromo-4-(N-ethylamino)-hexane hydrobromide is purified by recrystallization from a mixture of ether and alcohol.

1-bromo-4-(N-ethylamino)-hexane thus prepared melted at about 115–117° C. Analysis showed the presence of 32.9 percent carbon and 7.0 percent hydrogen as compared with the calculated values of 33.2 percent carbon and 6.6 percent hydrogen.

(5) 1-bromo-4-(N-ethylamino)-hexane represented by the formula

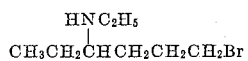

may be prepared as follows:

5 g. of 1-methoxy-4-(N-ethylamino)-hexane hydrobromide are dissolved in 20 cc. of water and the solution made alkaline with sodium hydroxide solution. The 1-methoxy-4-(N-ethylamino)-hexane which separates as an oil may be isolated by extracting it with ether, drying the ether over anhydrous magnesium sulfate and evaporating the ether, leaving the 1-methoxy-4-(N-ethylamino)-hexane as a slightly colored oil.

Other 1-bromo-4-(N-alkylamino)-hexanes within the scope of this invention may be prepared by the procedure described above for the preparation of 1-bromo-4-(N-ethylamino)-hexane, by the use of other alkylamines instead of ethylamines. For example, if instead of ethylamine, isopropylamine is reacted with 1-methoxy-4-chlorohexane, the final compound is 1-bromo-4-(N-isopropylamino)-hexane. Likewise, illustratively, the use of isobutylamine leads to the production of 1-bromo-4-(N-isobutylamino)-hexane.

We claim:

1. 1-bromo-4-(N-alkylamino)-hexanes represented by the formula

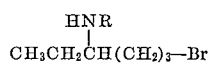

wherein R represents a lower alkyl hydrocarbon radical having from 1 to 6 carbon atoms; and salts thereof.

2. The process of preparing a compound represented by the formula

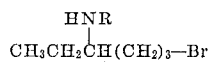

wherein R represents a lower alkyl hydrocarbon radical having from 1 to 6 carbon atoms, said process comprising reacting with propionaldehyde, a 3-methoxypropylmagnesium halide in which the halogen is of the class of chlorine and bromine, to produce 1-methoxyhexanol-4, reacting this compound with a thionyl halide in which the halogen is of the same class as before, to form the corresponding methoxyalkyl halide, reacting the halide with a primary amine of the formula R—NH₂, wherein R represents an alkyl group having from 1 to 6 carbon atoms, to form a 1-methoxy-4-(N-alkylamino)-hexane, reacting the alkylamino compound with hydrogen bromide to produce the hydrobromide salt of a 1-bromo-4-(N-alkylamino)-hexane wherein the alkyl group has from 1 to 6 carbon atoms and treating the hydrobromide salt with an alkali to yield the free base.

3. The process of preparing a compound represented by the formula

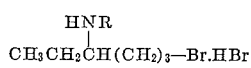

wherein R represents a lower alkyl hydrocarbon radical having from 1 to 6 carbon atoms, said process comprising reacting with propionaldehyde, a 3-methoxypropylmagnesium halide in which the halogen is of the class of chlorine and bromine, to produce 1-methoxyhexanol-4, reacting this compound with a thionyl halide in which the halogen is of the same class as before, to form the corresponding methoxyalkyl halide, reacting the halide with a primary amine of the formula R—NH₂, wherein R represents an alkyl group having from 1 to 6 carbon atoms, to form a 1-methoxy-4-(N-alkylamino)-hexane, and reacting the alkylamino compound with hydrogen bromide to produce the hydrobromide salt of a 1-bromo-4-(N-alkylamino)-hexane wherein the alkyl group has from 1 to 6 carbon atoms.

ROBERT C. ELDERFIELD.
JAMES D. HEAD.